US008387424B2

(12) United States Patent
Planteline

(10) Patent No.: US 8,387,424 B2
(45) Date of Patent: Mar. 5, 2013

(54) METHOD FOR MAKING A ROTATING LOCK FOR AN AUTOMOTIVE VEHICLE

(75) Inventor: Bernard Planteline, Creteil Cedex (FR)

(73) Assignee: Valeo Securite Habitacle, Creteil Cedex (FR)

( * ) Notice: Subject to any disclaimer, the term of this patent is extended or adjusted under 35 U.S.C. 154(b) by 253 days.

(21) Appl. No.: 12/524,292

(22) PCT Filed: Feb. 4, 2008

(86) PCT No.: PCT/EP2008/000867
§ 371 (c)(1),
(2), (4) Date: Jul. 23, 2009

(87) PCT Pub. No.: WO2008/095673
PCT Pub. Date: Aug. 14, 2008

(65) Prior Publication Data

US 2009/0320535 A1 Dec. 31, 2009

(30) Foreign Application Priority Data

Feb. 2, 2007 (FR) ..................................... 07 00740

(51) Int. Cl.
*E05B 9/04* (2006.01)
*H02K 15/00* (2006.01)

(52) U.S. Cl. ........................................... 70/373; 29/596

(58) Field of Classification Search .................... 70/373, 70/374, 237; 29/596
See application file for complete search history.

(56) References Cited

U.S. PATENT DOCUMENTS 1,003,957 A * 9/1911 Voight ............................ 70/373
1,422,595 A * 7/1922 Maxwell .......................... 70/373
2,155,440 A * 4/1939 Olson ............................. 70/358
2,650,492 A * 9/1953 Jacobi ............................. 70/490
2,977,786 A * 4/1961 Marron et al. .................. 70/493
3,821,886 A 7/1974 Ladewig
(Continued)

FOREIGN PATENT DOCUMENTS

AU 455 475 B2 11/1974
FR 2 232 947 A 1/1975
(Continued)

OTHER PUBLICATIONS

International Search Report w/translation from PCT/EP2008/000867 dated Jun. 6, 2008 (3 pages).

*Primary Examiner* — Suzanne Barrett
(74) *Attorney, Agent, or Firm* — Osha Liang LLP

(57) ABSTRACT

The invention relates to a method for making a rotating lock (10) for the locking system of an automotive vehicle, that comprises at least first and second complementary parts (5, 6) that can be assembled in at least one overlap area (7) for defining a stator (12) inside which a rotor (11) can be rotated, characterized in that it comprises the following steps: a first step for assembling the two parts (5, 6) in order to position in said overlap area (7) at least one opening (32) formed in the first part of the stator (6) opposite the opening of a corresponding cavity (34) formed in the second part of the stator (5); a second crimping step during which a crimping punch (22) is introduced in each opening (32) for at least partially deforming the wall of the opening (32) in the direction of the corresponding cavity (34) in order to crimp the assembly of the two parts of the stator (5, 6).

3 Claims, 4 Drawing Sheets

U.S. PATENT DOCUMENTS

Figure 1:
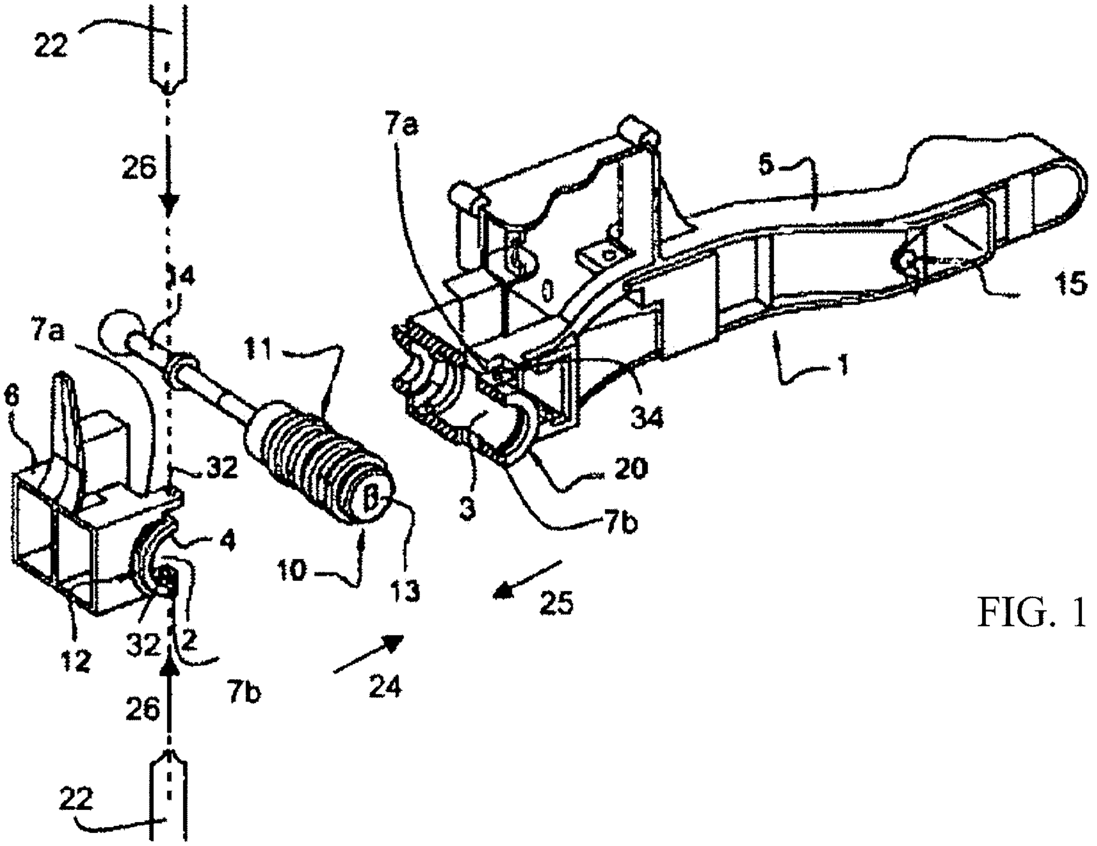

| | | | | |
|---|---|---|---|---|
| 3,988,911 | A * | 11/1976 | Lipschutz | 70/490 |
| 4,939,916 | A * | 7/1990 | Gruenewald et al. | 70/373 |
| 5,144,735 | A * | 9/1992 | Stark | 29/732 |
| 6,744,161 | B2 * | 6/2004 | Murata et al. | 310/71 |
| 6,965,186 | B2 * | 11/2005 | Fukuda et al. | 310/261.1 |
| 2004/0250579 | A1 * | 12/2004 | Capka et al. | 70/492 |
| 2009/0072655 | A1 * | 3/2009 | Sano et al. | 310/217 |
| 2009/0121577 | A1 * | 5/2009 | Tatematsu et al. | 310/218 |
| 2009/0314045 | A1 * | 12/2009 | Giacomin et al. | 70/237 |

FOREIGN PATENT DOCUMENTS

FR 2 248 390 A 5/1975

* cited by examiner

METHOD FOR MAKING A ROTATING LOCK FOR AN AUTOMOTIVE VEHICLE

The present invention relates to a method for manufacturing a rotary bolt for a locking system of a motor vehicle and a bolt manufactured via such a method.

More particularly, the invention relates to a rotary bolt to be mounted on an opening element of the motor vehicle for the lock mechanisms, notably for a door, a tailgate, a tailgate window, a trunk, a glovebox or else for a vehicle fuel tank cap.

The invention also applies to the bolts for a rotary electric switch for a motor vehicle antitheft device.

The rotary bolts comprise a stator, inside which a rotor is capable of rotating when the key fitting the bolt is inserted so as to release the locking system of the motor vehicle.

In most cases, the stators are made in one piece.

However, in certain specific applications, the stator needs to be in two complementary portions capable of being assembled. The bolts then comprise attachment means making it possible to rigidly secure the two portions of the stator together.

These attachment means consist of cylindrical pins, that are elastic or threaded, capable of being inserted into holes formed through the two portions of the stator and positioned facing one another.

This structure is sufficiently rigid to ensure the integrity of the bolt, notably in the case of the rotor being torn out or smashed in.

However, an alternative method is sought for firmly assembling the two parts forming the stator, making it possible to reduce the costs and quality risks of manufacture while ensuring the integrity of the bolt.

The object of the present invention is to remedy this problem by proposing a method for manufacturing a rotary bolt for a locking system of a motor vehicle comprising at least a first portion and a second portion that are complementary, capable of being assembled in at least one overlap zone in order to form a stator inside which a rotor is capable of rotating, characterized in that it comprises the following steps:

- a first step of assembling said two portions in order to position in the overlap zone at least one orifice formed in the first portion of the stator facing the opening of a corresponding cavity formed in the second portion of the stator,
- a second step of crimping during which a crimping punch is inserted into each orifice in order to at least partially deform the wall of the orifice in the direction of the corresponding cavity so as to crimp the assembly of the two portions of the stator.

A further subject of the invention is a rotary bolt for a locking system of a motor vehicle comprising at least a first and a second portion assembled in at least one overlap zone in order to form a stator inside which a rotor is capable of rotating, characterized in that it comprises at least one orifice formed in a first portion of the stator positioned facing the opening of a corresponding cavity formed in a second portion of the stator, the wall of the orifice having been at least partially deformed by the insertion of a crimping punch in the direction of the corresponding cavity, in order to crimp the two portions of the stator.

Figure 2A:
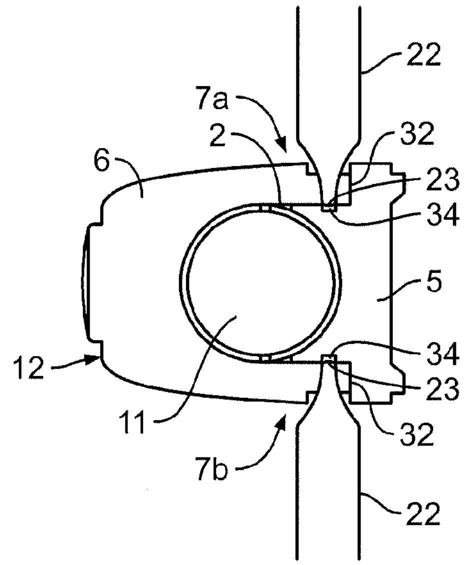
Figure 2B:
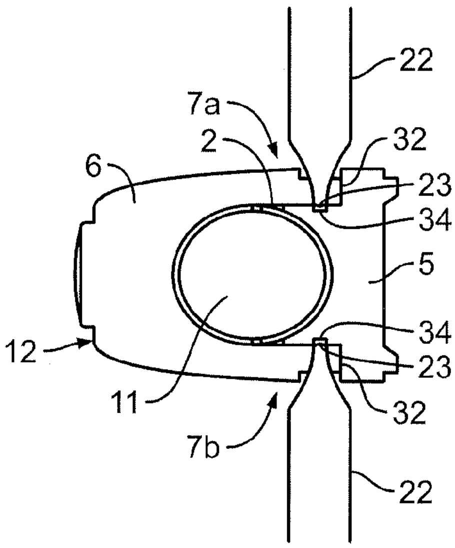
Figure 2C:
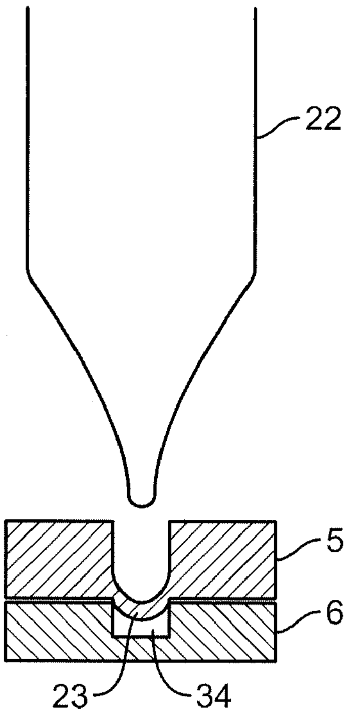
Figure 2D:
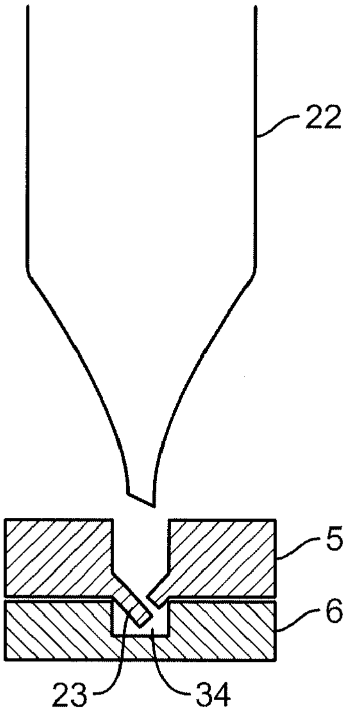
Figure 3:
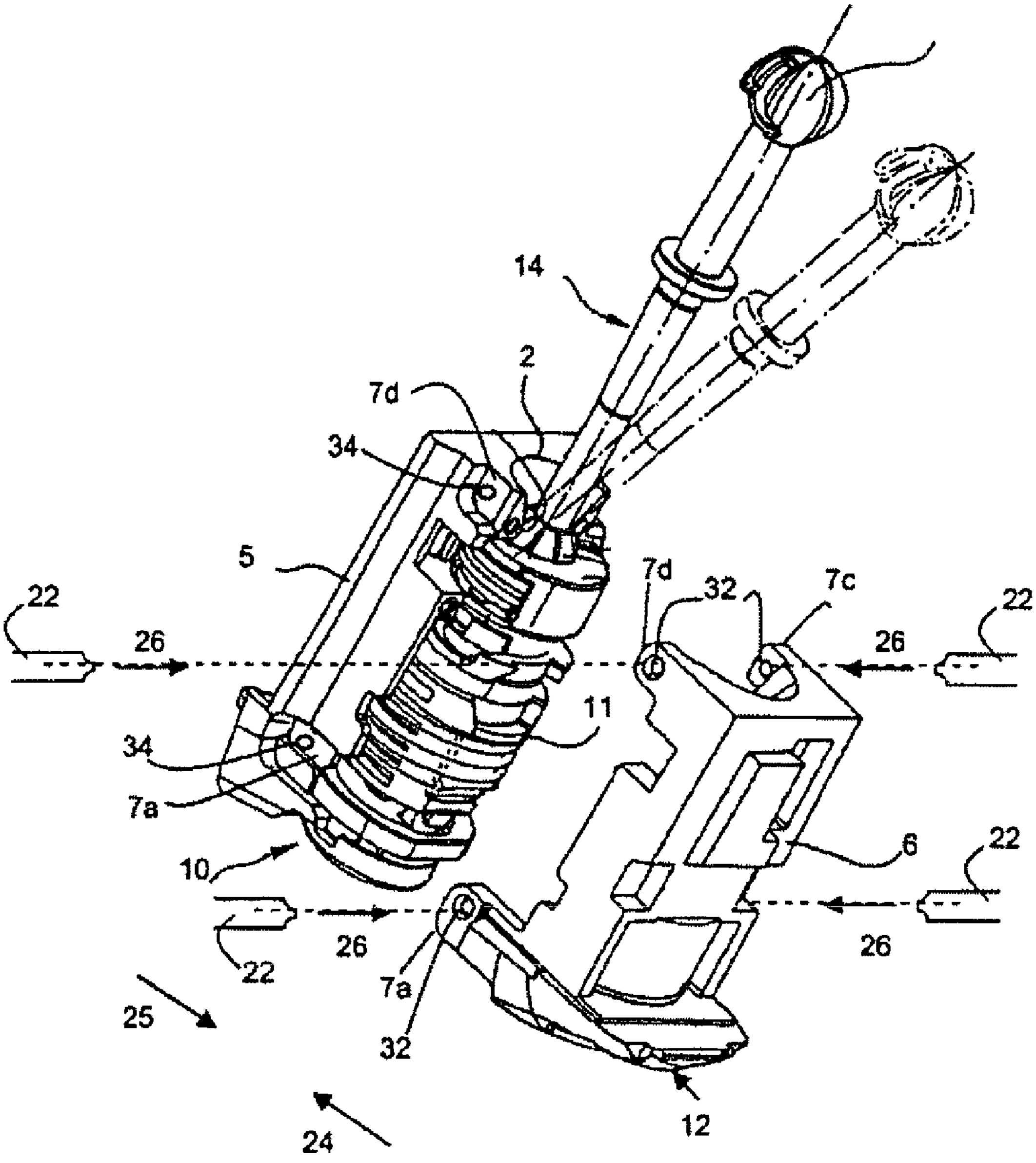

Other advantages and features will appear on reading the description of the invention and of the following figures in which:

FIG. 1 is an exploded view in perspective of a bolt according to a first embodiment, FIGS. 2*a* and 2*b* are views in cross section of a bolt during the manufacturing method according to a second embodiment with two different crimping methods, and FIGS. 2*c* and 2*d* show the after-crimping effects according to the two different crimping methods, FIG. 3 is an exploded view in perspective of the bolt of FIGS. 2*a* and 2*b,*

Figure 4A:
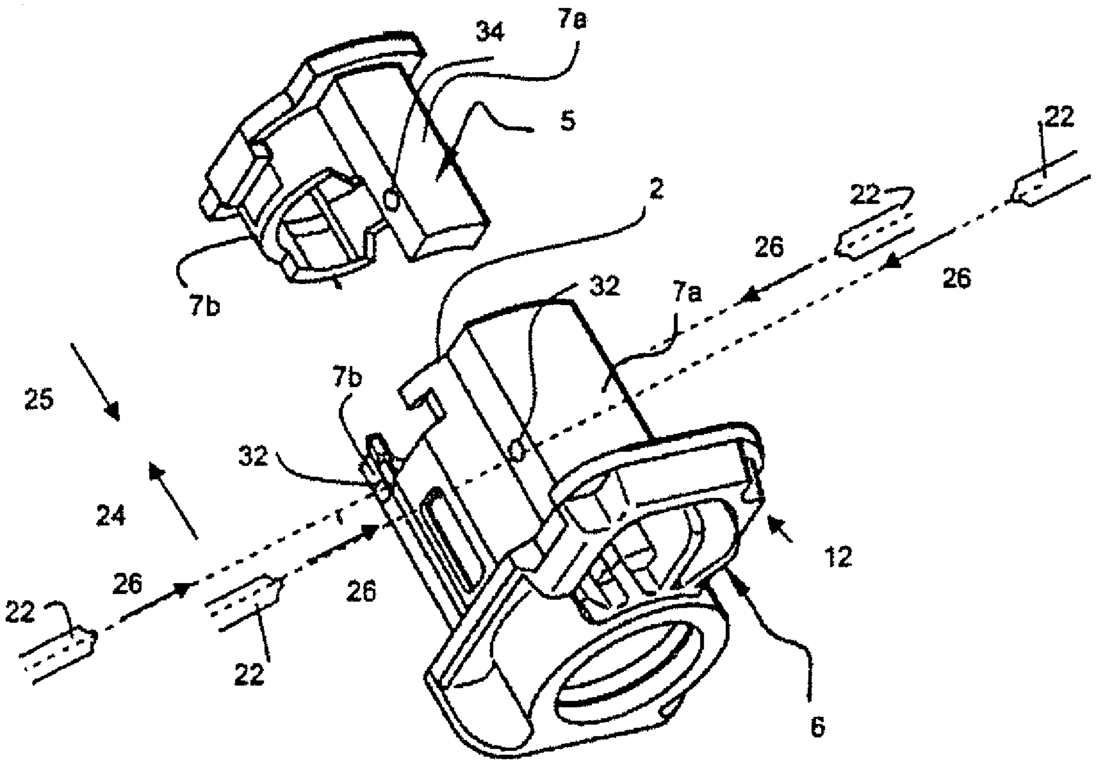
Figure 4B:
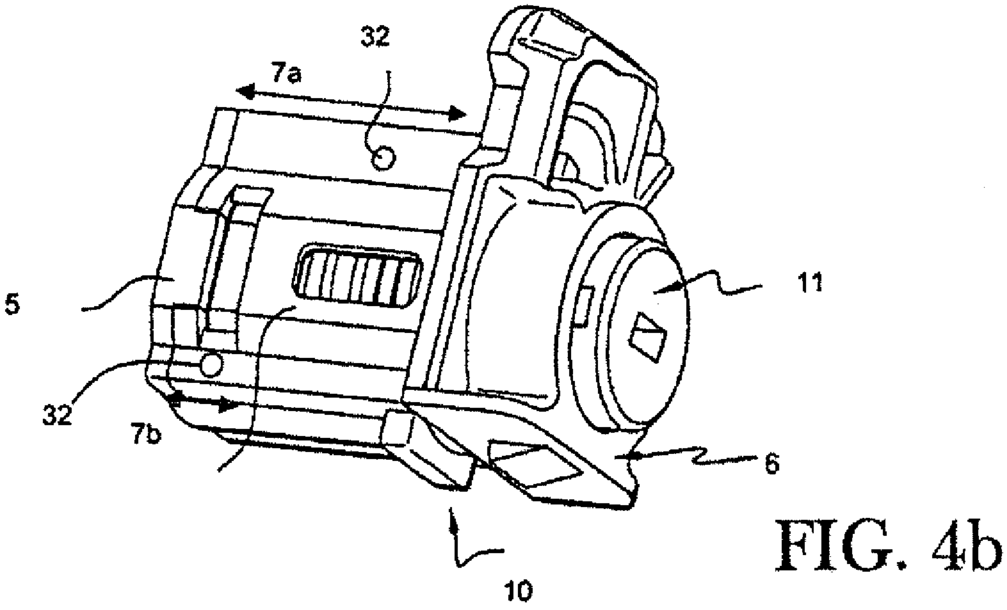

FIG. 4*a* is a view in perspective of two stator portions of a bolt according to a third embodiment, FIG. 4*b* is a view similar to FIG. 4*a* representing the bolt at the end of manufacture according to the invention.

In all the figures, identical elements bear the same reference numbers.

FIG. 1 represents various elements of a rotary bolt for a locking system of a motor vehicle according to the invention.

It is understood that the invention applies to any type of rotary bolt consisting of a rotor and a stator such as a bolt for an opening element of a motor vehicle or a bolt of a rotary electric switch for a motor vehicle antitheft device.

More particularly, the invention applies to the bolts to be mounted on a motor vehicle opening element for the locking mechanisms, particularly for a door such as a door with a moveable opening handle or a fixed handle, a tailgate, a tailgate window, a trunk, a glovebox or else for a vehicle fuel tank cap.

FIG. 1 illustrates a motor vehicle door locking system comprising a support 1 serving as an anchoring base with an external opening handle, and a rotary double-locking bolt 10.

In this embodiment, the moveable handle can be actuated manually from outside the vehicle. The assembly is conventionally arranged so that the mobility of the handle is capable of controlling a lock mechanism associated with a door (not shown).

The bolt 10 designed to double-lock the opening element of the door is of the rotary type, that is to say that it consists of a rotor 11 capable of being axially rotated inside a stator 12 when the key fitting the bolt 10 is inserted into the key slot 13 formed at the end of the rotor 11 so as to release the locking system of the motor vehicle.

It is understood that, in all of this text, "rotor" designates very generally any subassembly comprising a rotor body through which radial housings are formed that are capable of receiving springs that are mounted so as to be able to move in radial translation and that are coupled to return springs permanently bringing them into protruding positions relative to the body of the rotor.

The bolt 10 is installed on the support 1 so that the key slot 13 formed at the end of the rotor 11 can be accessed from the outside of the motor vehicle.

The support 1 may be secured to the door by at least one assembly screw which is capable, on the one hand, of being inserted into a hole formed through a panel of the door, and, on the other hand, of interacting with a tapped bore 15 formed in a portion of the support 1.

A portion of the support 1 forms the stator 12 by delimiting a housing 2 which is capable of receiving the rotor 11 of the bolt 10.

The housing 2 has a substantially cylindrical shape, since the portion of the support 1 which delimits it has the function of forming the stator 12 of the bolt 10, that is to say of guiding the axial rotation of the rotor 11 of the bolt 10.

Moreover, the support 1 comprises abutment means 20 which are capable of immobilizing, in axial translation, the rotor 11 of the bolt 10 inside said housing 2. The presence of the abutment means 20 is essential for ensuring an omnidirectional retention of the rotor 11 of the bolt 10 and hence of ensuring that the portion of the support 1, which delimits the housing 2, is capable of fully playing its role of stator.

This feature also makes it possible to significantly increase the mechanical strength of the assembly, notably with respect to possible attempts to break in by tearing out or smashing in the rotor 11.

In this exemplary embodiment, it is the two ends of the housing 2 that are open, since a front opening is provided to ensure access to the key slot 13 of the rotor 11, while a rear opening is necessary for allowing the passage of a conventional connection element 14 designed to be coupled to the locking mechanism of the door.

As can still be clearly seen in FIG. 1, the abutment means 20 are in this instance actually formed by protruding ribs. Each of them is formed close to one of the open ends of the housing 2, on the inner surface of the portion of the support 1 which delimits the housing 2.

The housing 2 is defined by the juxtaposition of two semi-cylindrical walls 3, 4 which are respectively provided on distinct constituent elements of the support 1, called portions 5, 6, each portion 5, 6 being designed to be assembled radially with the other complementary stator portion in at least one overlap zone 7 in order to form the stator 12 of the bolt 10 inside which a rotor 11 is capable of being rotated.

In this embodiment, the stator portion 6 represented on the left in FIG. 1 overlaps the stator portion 5 represented on the right in two symmetrical overlap zones 7*a*, 7*b* on the general plane of the support 1.

The two overlap zones 7*a*, 7*b* are formed by connecting fasteners supported by the ends of the left-hand stator portion 6 overlapping sockets supported by the ends of the right-hand stator portion 5 when the two stator portions 5, 6 are assembled.

This feature makes it possible to mount the rotor 11 inside the housing 2, even when, as previously described, the support 1 is formed so as to ensure the immobility of the rotor 11 in axial translation.

The assembly is arranged so that, when the various portions 5, 6 are assembled, the two corresponding semi-cylindrical walls 3, 4 are positioned facing one another and thereby form the housing 2 the shape and dimensions of which are chosen to hold and guide in axial rotation the rotor 11 of the bolt 10.

In this particular embodiment, the housing 2 is defined by the juxtaposition of only two semi-cylindrical walls 3, 4 which have substantially identical shapes.

In a second embodiment illustrated by FIG. 3, the housing 2 is also defined by the juxtaposition of only two complementary stator portions 5, 6 being assembled radially.

The stator portion 6 shown on the right in FIG. 3 overlaps the stator portion 5 shown on the left in four overlap zones 7*a*, 7*b* (not visible), 7*c* and 7*d*.

The four overlap zones 7*a*, 7*b*, 7*c*, 7*d* supported by the right-hand support portion 6 form four connecting fasteners, two of which 7*a* and 7*b* are diametrically opposed and positioned on the end of the rotor 11 comprising the key slot 13 of the lock. Two other overlap zones 7*c* and 7*d* also diametrically opposed are positioned on the opposite end of the rotor 11.

The four corresponding overlap zones 7*a*, 7*b*, 7*c*, 7*d* supported by the left-hand support portion 5 are formed by four connecting faces.

In a third embodiment, illustrated in FIGS. 4*a* and 4*b*, the housing 2 is defined by the axial assembly of two stator portions 5, 6 that are radially complementary.

In this embodiment, in order to be able to install all of the internal components inside the bolt 10, it is necessary for the stator 12 to be in the form of two portions 5, 6 capable of being assembled by axial interlocking in the overlap zone 7.

The stator 12 then consists of a front stator portion 6 surrounding the key slot 13 of the rotor 11, and a rear stator portion 5, which are substantially tubular and radially complementary.

Advantageously, the front stator portion 6 overlaps the rear stator portion 5 in two overlap zones 7*a* and 7*b*.

A first overlap zone 7*a* is formed by the engagement of a fastener of the rear stator portion 5 in a duct supported by the front stator portion 6.

A second overlap zone 7*b* is formed by a sliding lower face of a rear stator portion 5 being overlapped by a sliding upper face of a front stator portion 6.

For all the embodiments of a stator 12 of a bolt 10 in two portions, such as those described above, the invention proposes a method of manufacture comprising a first assembly step followed by a second crimping step making it possible to assemble and crimp the two stator portions 5, 6 together in order to obtain the bolt 10 according to the invention.

For this, a first stator portion 6 comprises at least two orifices 32 in the overlap zone 7.

Each orifice 32 comprises a portion of wall 23 capable of being deformed by the insertion of a crimping punch 22.

Preferably, each overlap zone comprises an orifice.

It is also possible to envisage that two orifices are formed in the front stator portion 6 in each of the two overlap zones 7*a*, 7*b*, as illustrated in the particular embodiment of FIG. 4*a*.

Therefore, two orifices 32 are provided laterally and symmetrically in two opposite side faces of the duct of the first overlap zone 7*a* and two orifices 32 are provided laterally and symmetrically in two opposite side faces of a sliding upper face of the second overlap zone 7*b*.

Preferably, the orifices 32 provided in the duct are situated close to the end comprising the key slot 13 so that they are longitudinally offset from the orifices 32 provided in the sliding upper face.

Furthermore, for all of the embodiments, the stator portion 5 designed to be assembled with the complementary stator portion 6 comprises at least two cavities 34 in the overlap zone.

The position and the dimensions of the cavities correspond to those of the orifices 32 so that, once the stator portions 5, 6 have been assembled, on the one hand, a portion of wall 23 of each orifice 32 is positioned facing the opening of the corresponding cavity 34 and, on the other hand, the cavities are capable of receiving deformed portions of wall 23 of the orifices 32.

Then, in the first step of assembling the two stator portions 5, 6, a portion of wall 23 of each orifice 32 is positioned facing the opening of a corresponding cavity 34.

Therefore, the two stator portions 5, 6 are assembled as indicated in FIGS. 1, 3 and 4*a* by the arrows 24 and 25 so as to correctly position the portions of wall 23 of each orifice 32 facing the corresponding openings of cavity 34.

Then, in the second crimping step, a crimping punch 22 is inserted into each orifice 32 in order to deform the portions of wall 23 in the direction of the cavities 34 so as to crimp the assembly of the two stator portions 5, 6.

The direction of the crimping punch 22 in each orifice 32 is indicated in FIGS. 1, 3 and 4*a* by the arrows 26.

According to a first variant method and advantageously, the orifices 32 are blind and it is the bottom wall of each blind orifice 32 that forms the portion of wall 23 capable of being positioned facing the opening of the corresponding cavity during the first assembly step and capable of being deformed during the second crimping step.

An alternative to this variant method proposes through-orifices 32. The side walls of each through-orifice 32 then form the portion of wall 23 that is capable of being positioned facing the opening of the corresponding cavity 34 during the first assembly step.

In this alternative, the portion of wall 23 is capable of being deformed during the second crimping step. For this, the through-orifices 32 have an opening of smaller dimension than the transverse dimension of the deformation end of the crimping punch 22 so that the end of the crimping punch 22 partially takes away the side walls 32 into the cavity 34.

According to a second variant method, the crimping punch 22 is provided to have a deformation end with a substantially flat shape in order to discontinuously deform the portion of wall 23 in the cavity 34 during the second crimping step.

This variant is illustrated in FIG. 2*a* showing two stator portions being crimped according to the embodiment substantially equivalent to FIG. 3.

The portion of wall 23 is then broken forming a lug in the corresponding cavity 34.

According to an alternative to this variant represented in FIG. 2*b*, the crimping punch 22 has a deformation end of rounded shape in order to continuously deform the portion of wall 23 in the cavity 34 during the second crimping step.

By crimping with this tool, the portion of wall 23 is deformed without breakage by penetration into the cavity 34, increasing the strength of the crimp.

FIGS. 2*c* and 2*d* show the after-crimping effects in the wall 23 and cavity 34. As shown in FIG. 2*c*, the wall is continuous even after crimping, because the crimping tool has a deformation end of rounded shape in order to continuously deform the portion of wall 23 in the cavity 34 during the second crimping step. In contrast, FIG. 2*d* shows a discontinuous wall with breaks, as the wall in this figure is crimped with a crimping tool having a deformation end with a substantially flat shape in order to discontinuously deform the portion of wall 23 in the cavity 34 during the second crimping step.

This then gives a bolt 10 assembled and crimped as shown in FIG. 4*b* for which the number of parts necessary for assembling the stator 12 has been reduced.

Specifically, the manufacturing method according to the invention no longer requires the insertion of additional pins thereby avoiding the risks of losses during the transport of the parts or of omission and losses or else of incorrect positioning of the pins of the stator portions 5, 6 preventing subsequent assembly on a vehicle.

The stator portions 5, 6 of a bolt 10 are assembled firmly in a simple and automated manner.

The result of this is a significant reduction in production and installation costs.

The invention claimed is:

1. A method for manufacturing a rotary bolt for a locking system of a motor vehicle comprising at least a first portion and a second portion that are complementary, capable of being assembled in at least one overlap zone in order to form a stator inside which a rotor is capable of rotating, the method comprising:

- assembling said first and second portions in order to position at least one orifice in the overlap zone, wherein the at least one orifice is formed in the first portion of the stator facing an opening of a corresponding cavity formed in the second portion of the stator; and
- crimping by inserting a crimping punch into each orifice in order to at least partially deform a wall of the orifice in a direction of the corresponding cavity so as to crimp the assembly of the first and second portions of the stator,
- wherein the crimping punch comprises one selected from the group consisting of a rounded-shaped deformation end in order to continuously deform a portion of the wall in the cavity during crimping and a substantially flat-shaped deformation end in order to discontinuously deform the portion of the wall in the cavity during crimping.

2. The method for manufacturing a bolt as claimed in claim 1, wherein the at least one orifice is blind and wherein a bottom wall of each blind orifice forms a portion of wall capable of being positioned facing the opening of the corresponding cavity and capable of being deformed during crimping.

3. The method for manufacturing a bolt as claimed in claim 1, wherein the at least one orifice is a through-orifice and wherein a side wall of each through-orifice forms a portion of wall that is capable of being positioned facing the opening of the corresponding cavity and capable of being deformed during crimping.

* * * * *